(12) United States Patent
Amano

(10) Patent No.: US 8,890,994 B2
(45) Date of Patent: Nov. 18, 2014

(54) IMAGE CAPTURING APPARATUS

(75) Inventor: Kenichiro Amano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 321 days.

(21) Appl. No.: 13/320,645

(22) PCT Filed: Apr. 22, 2010

(86) PCT No.: PCT/JP2010/057643
§ 371 (c)(1),
(2), (4) Date: Nov. 15, 2011

(87) PCT Pub. No.: WO2010/137444
PCT Pub. Date: Dec. 2, 2010

(65) Prior Publication Data
US 2012/0057057 A1    Mar. 8, 2012

(30) Foreign Application Priority Data

May 25, 2009 (JP) .................................. 2009-125849

(51) Int. Cl.
*G03B 13/00* (2006.01)
*G03B 13/36* (2006.01)
*H04N 5/232* (2006.01)
*G02B 7/36* (2006.01)
*H04N 101/00* (2006.01)

(52) U.S. Cl.
CPC ............ *G03B 13/36* (2013.01); *H04N 2101/00* (2013.01); *H04N 5/23212* (2013.01); *G02B 7/365* (2013.01); *H04N 5/2393* (2013.01)
USPC ............ 348/345; 348/294; 348/349; 348/350

(58) Field of Classification Search
USPC .................. 348/294, 345, 349, 350
See application file for complete search history.

(56) References Cited

U.S. PATENT DOCUMENTS

| 2008/0259202 A1 | 10/2008 | Fujii | |
| 2009/0086084 A1* | 4/2009 | Komaba et al. | 348/349 |
| 2009/0140122 A1* | 6/2009 | Suzuki | 250/201.2 |

FOREIGN PATENT DOCUMENTS

| JP | 3592147 B2 | 11/2004 |
| JP | 2007-281296 A | 10/2007 |

(Continued)

OTHER PUBLICATIONS

Korean Office Action issued on Apr. 26, 2013 in counterpart Korean Application No. 10-2011-7030552.

(Continued)

*Primary Examiner* — Roberto Velez
*Assistant Examiner* — Yih-Sien Kao
(74) *Attorney, Agent, or Firm* — Carter, DeLuca, Farrell & Schmidt, LLP

(57) ABSTRACT

An image capturing apparatus comprising an image sensor including image forming pixels each of which generates a signal for image generation, and focus detection pixels each of which generates a signal for phase difference detection, readout means for reading out the signal of each pixel of the image sensor, focus detection means for detecting a focus by a phase-difference detection method using the signals for phase difference detection from the focus detection pixels, and switching means for switching a combination of the focus detection pixels to be used for focus detection by the focus detection means between a case in which the readout means reads out the signals of the pixels of the image sensor after thinning-out and a case in which the readout means reads out the signals of the pixels of the image sensor without thinning-out.

5 Claims, 6 Drawing Sheets

(56) References Cited

FOREIGN PATENT DOCUMENTS

| JP | 2008-122835 A | 5/2008 |
| JP | 2009-049858 A | 3/2009 |
| JP | 2009-089144 A | 4/2009 |
| WO | 2009/020031 A1 | 2/2009 |
| WO | 2009/054263 A1 | 4/2009 |

OTHER PUBLICATIONS

European search report issued on Mar. 6, 2013 in counterpart European Application No. 10780401.5.

* cited by examiner

IMAGE CAPTURING APPARATUS

TECHNICAL FIELD

The present invention relates to an image capturing apparatus for capturing an image of an object and, more particularly, to an image capturing apparatus for detecting a focus based on signals from focus detection pixels arranged in an image sensor.

BACKGROUND ART

Conventionally, for example, Japanese Patent No. 3592147 proposes an image capturing apparatus including focus detection pixels discretely arranged among image forming pixels in an image sensor. According to Japanese Patent No. 3592147, the image sensor partially includes a plurality of focus detection pixels of two types (phase-difference detection pixels). FIG. 5 is a view showing an example of the pixel arrangement of an image sensor including focus detection pixels arranged on specific lines. Referring to FIG. 5, R, G, and B represent pixels with red, green, and blue filters arranged on the light entrance planes, respectively. S1 and S2 indicate focus detection pixels that have fields of view symmetrical about the optical axis center so as to attain different optical characteristics. As shown in FIG. 5, the focus detection pixels are arranged on the image sensor among the pixels that have R, G, and B color filters to obtain a color image signal.

FIG. 6 shows the structure of the first focus detection pixel S1. Referring to FIG. 6, the first focus detection pixel has a microlens 501 arranged on the top. A smoothing layer 502 constitutes a plane to form the microlens. A light-shielding layer 503 has an opening portion shifted (decentered) from the center to one side of the photoelectric conversion area of the pixel. The light-shielding layer 503 has an effect of a stop for restricting incident light. Reference numeral 504 denotes a photoelectric conversion element.

FIG. 7 shows that the structure of the second focus detection pixel S2. FIG. 7 is different from FIG. 6 whereby the opening portion of a light-shielding layer 603 is provided to be symmetrical about the optical axis center with respect to the opening portion of the light-shielding layer 503 of the first focus detection pixel. Note that reference numeral 601 denotes a microlens; 602, a smoothing layer; and 604, a photoelectric conversion element, as in FIG. 6.

In FIG. 5, as the number of pixels increases, the line including the first focus detection pixels S1 and that including the second focus detection pixels S2 form approximate images. If object light is in focus on the pixels through the imaging optical system, the image signal of the line including the first focus detection pixels S1 coincides with that of the line including the second focus detection pixels S2. If object light is out of focus, a phase difference is generated between the image signal of the line including the first focus detection pixels S1 and that of the line including the second focus detection pixels S2. A phase shift generated when light goes out of focus toward the front of the camera is opposite in direction to a phase shift generated when light goes out of focus toward the rear of the camera. When viewed from the first focus detection pixel S1 and the second focus detection pixel S2, the imaging optical system looks as if the pupil were divided symmetrically about the optical center.

FIGS. 8A and 8B are schematic views for explaining the phase shift of an image caused by defocus. Referring to FIGS. 8A and 8B, the first focus detection pixels S1 and second focus detection pixels S2 are abstractly made closer and represented by points A and B, respectively. To help understanding, the R, G, and B pixels for image capturing are not illustrated so that only the focus detection pixels are arranged as it were. Light from a specific point of an object can be divided into a light beam ΦLa which enters the point A via a pupil corresponding to the point A and a light beam ΦLb which enters the point B via a pupil corresponding to the point B. The two light beams come from the same point. Hence, if the imaging optical system has a focus on the image sensor, the light beams reach one point of a single microlens, as shown in FIG. 8A. However, if the focal point moves to the near side by, for example, a distance x, the light beams shift from each other by the change amount of the light incident angle, as shown in FIG. 8B. If the focal point moves to the far side by the distance x, the light beams shift in opposite directions.

For these reasons, the image signal formed by the array of the points A and that formed by the array of the points B coincide with each other if the imaging optical system is in focus. Otherwise, the image signals shift. The image capturing apparatus described in Japanese Patent No. 3592147 detects a focus based on the above-described principle.

However, when capturing a still image, the image sensor including the focus detection pixels suffers a loss of pixel data corresponding to the positions of the focus detection pixels. If signals obtained by the focus detection pixels are used as image signals for a still image, the continuity to the peripheral pixel signals is lost because of the different fields of view, and the image looks flawed.

To solve this problem, the image capturing apparatus described in Japanese Patent No. 3592147 interpolates the image signals corresponding to the positions of the focus detection pixels based on the image signals of the peripheral pixels. In the pixel arrangement of the image sensor shown in FIG. 5, interpolation data from the peripheral pixels are inserted in the portions S1 and S2 included in the image signals of the image capturing. Referring to FIG. 5, the R, G, and B pixels for image capturing are arrayed in a Bayer matrix. Several G pixels are replaced with the focus detection pixels S1 and S2. In place of the data of each G pixel that is lost due to the presence of the focus detection pixel S1 or S2, synthetic G pixel data is generated from the data of four adjacent G pixels located in the oblique directions, and applied as the lost G pixel data.

A conventional digital camera or the like displays an image on a liquid crystal display device or the like in a live view display mode so that the user can determine the composition by looking not through an optical viewfinder but at the liquid crystal screen. In the live view display mode, instead of reading out the image signals of all pixels of an image sensor whose pixels are growing in number, the signals of all pixels are thinned out at a predetermined ratio and then read out. When the pixel signals are thinned out, image data read out after the thinning-out does not always include the focus detection pixels. This makes it impossible to detect a focus by the phase-difference detection method.

SUMMARY OF INVENTION

The present invention has been made in consideration of the above-described problem, and enables focus detection by the phase-difference detection method even when thinning out and reading out pixel signals.

According to the present invention, there is provided an image capturing apparatus comprising: an image sensor including image forming pixels each of which photoelectrically converts an object image formed via an imaging lens to generate a signal for image generation, and focus detection pixels which are discretely arranged among the plurality of image forming pixels, each focus detection pixel dividing a pupil region of the imaging lens and photoelectrically converting the object image from the divided pupil region to generate a signal for phase difference detection; readout means for reading out the signal of each pixel of the image sensor; focus detection means for detecting a focus by a phase-difference detection method using the signals for phase difference detection from the focus detection pixels; and switching means for switching a combination of the focus detection pixels to be used for focus detection by the focus detection means between a case in which the readout means reads out the signals of the pixels of the image sensor after thinning-out and a case in which the readout means reads out the signals of the pixels of the image sensor without thinning-out.

Further features of the present invention will become apparent from the following description of exemplary embodiments with reference to the attached drawings.

DESCRIPTION OF EMBODIMENTS

Figure 1:
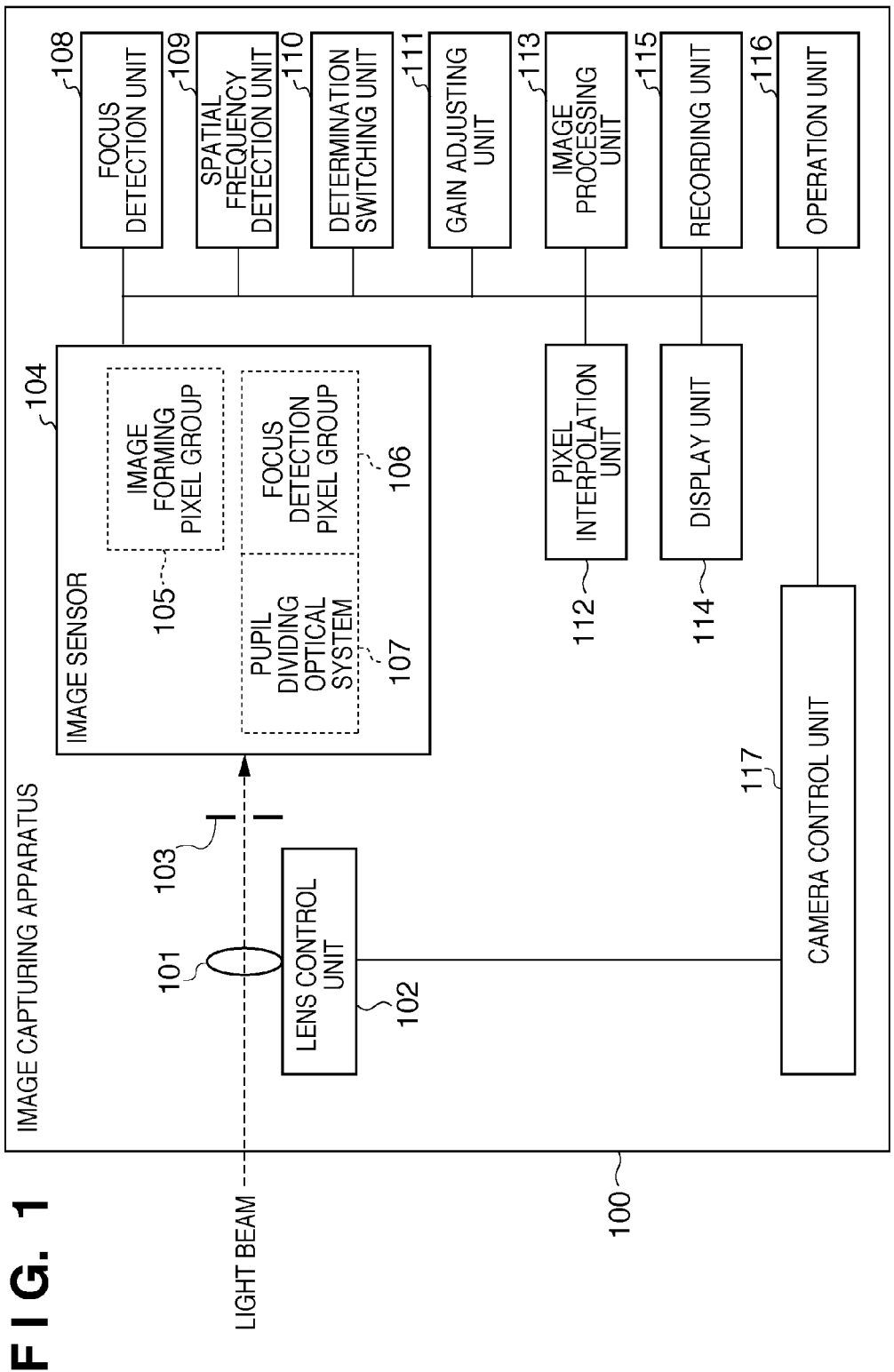
FIG. 1 is a block diagram showing the overall arrangement of an image capturing apparatus according to an embodiment of the present invention.

An embodiment of the present invention will now be described with reference to the accompanying drawings. FIG. 1 is a block diagram showing the overall arrangement of an image capturing apparatus according to an embodiment of the present invention.

Referring to FIG. 1, an image capturing apparatus 100 includes a lens (imaging lens) 101 which forms an image of an object, a lens control unit 102 which controls the focal position of the lens, and a stop 103 which adjusts the incident light amount. The image capturing apparatus 100 also includes an image sensor 104 which is formed from a CMOS (Complementary Metal Oxide Semiconductor) sensor to photoelectrically convert an object image. The image sensor 104 includes an image forming pixel group 105 formed from pixels for image generation, which have R, G, and B color filters provided on the light-receiving surfaces, and are used to acquire image signals for image capturing. The image sensor 104 also includes a focus detection pixel group 106 formed from a plurality of sets of focus detection pixels (phase-difference detection pixels) to be used for focus detection, which have optical structures symmetrical about the optical axis, and exist in a plurality of focus detection regions while being discretely arranged. The image sensor 104 also includes a pupil dividing optical system 107 which restricts incident light and makes it enter a pair of focus detection pixels of the focus detection pixel group 106 as if the pupil region of the imaging lens were divided symmetrically.

The image capturing apparatus 100 also includes a focus detection unit 108 which detects a focus based on the phase shift amount of two types of focus detection pixels which have optical structures symmetrical about the optical axis in the focus detection pixel group 106. The image capturing apparatus 100 also includes a spatial frequency detection unit 109 which detects the strength of the high-frequency component of an image signal formed from, out to the image forming pixel group 105, a plurality of pixels (to be referred to as a neighboring pixel group hereinafter) located near the focus detection pixel group 106. The image capturing apparatus 100 also includes a determination switching unit 110 which selects interpolation processing by a pixel interpolation unit 112 (to be described later) based on a focus detection result using the focus detection pixel group 106 or interpolation processing by the pixel interpolation unit 112 based on the strength of a high-frequency component using the spatial frequency detection unit 109.

Figure 6:
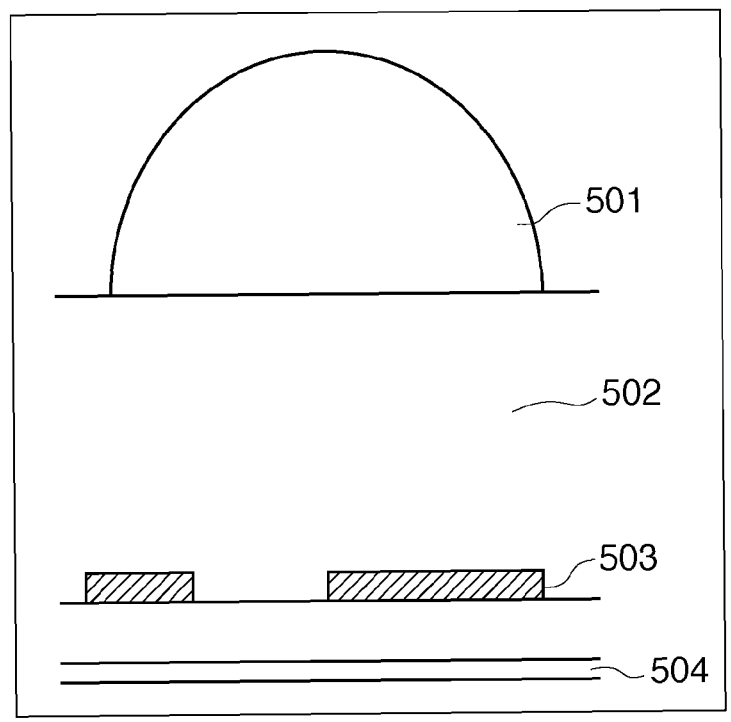
FIG. 6 is a view showing the structure of a conventional first focus detection pixel.
Figure 7:
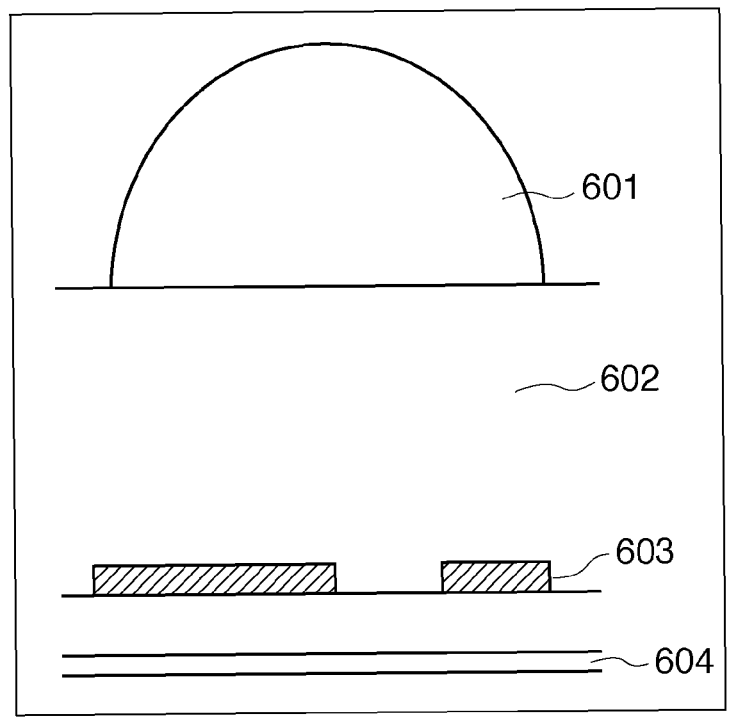
FIG. 7 is a view showing the structure of a conventional second focus detection pixel.
Figure 8A:
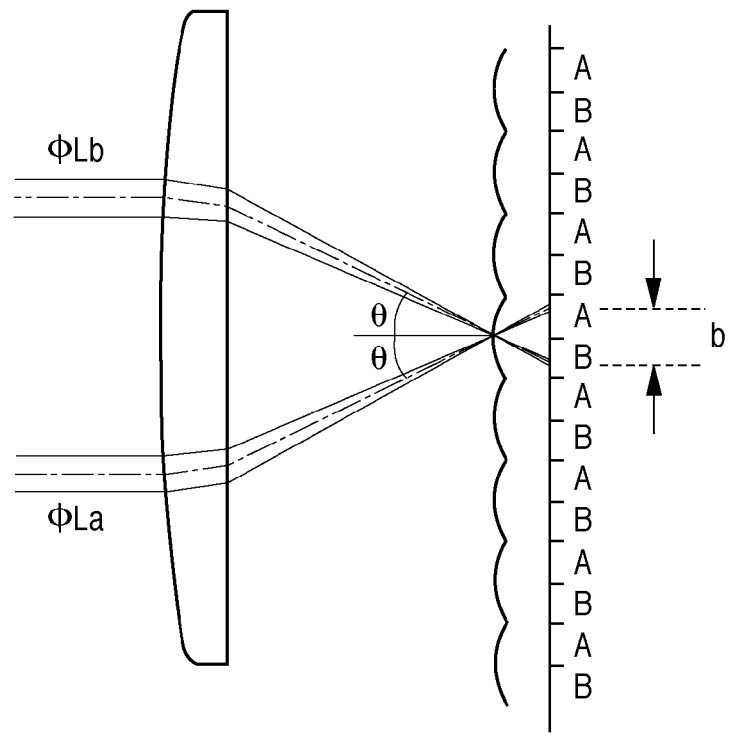
FIGS. 8A and 8B are schematic views for explaining the phase shift of an image caused by defocus.
Figure 8B:
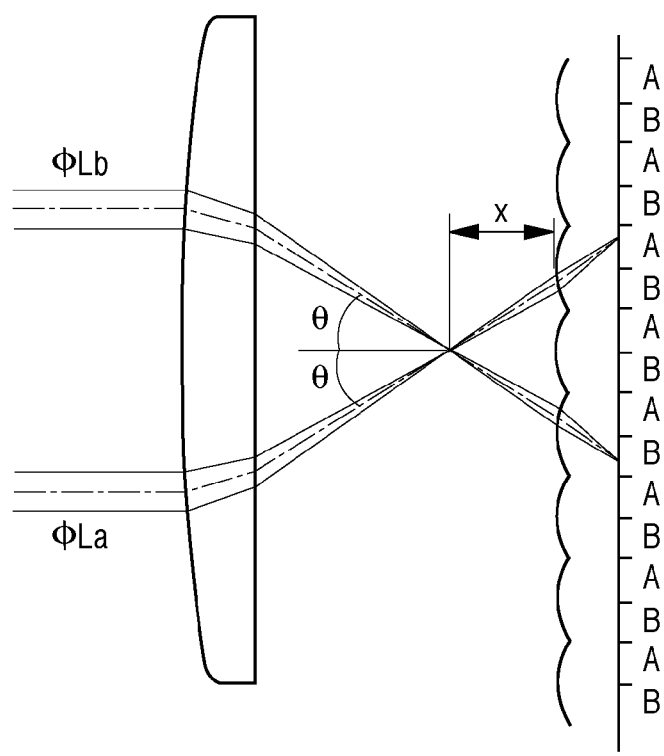

In the focus detection pixel group 106, the fields of view are restricted by light-shielding layers 503 and 603, as shown in FIGS. 6 and 7. The focus detection pixel group 106 has no color filters on the light entrance planes. Hence, the level of an image signal of the focus detection pixel group 106 is different from the level of an image signal formed from, out of the image forming pixel group 105, a plurality of pixels (to be referred to as a neighboring pixel group hereinafter) located near the focus detection pixel group 106. To make the level of the image signal of the focus detection pixel group 106 closer to the level of the image signal of the neighboring pixel group, the image capturing apparatus 100 includes a gain adjusting unit 111 which adjusts the gain of the focus detection pixel group 106.

The image capturing apparatus 100 also includes the pixel interpolation unit 112 which generates, based on determination by the determination switching unit 110, image data corresponding to the positions of the focus detection pixels of the focus detection pixel group 106 by interpolation based on the image signal of the image forming pixel group 105 obtained from the image sensor 104. The image capturing apparatus 100 also includes an image processing unit 113 which performs gamma correction, white balance adjustment, resampling, predetermined image compression coding, and the like for the image signal output from the image forming pixel group 105. The image capturing apparatus 100 also includes a display unit 114 which displays image data output from the image processing unit 113, and a recording unit 115 which records the image data. The image capturing apparatus 100 also includes an operation unit 116, which receives an operation input of the operator, and a camera control unit 117 which controls the entire image capturing apparatus 100. Note that the camera control unit 117 performs auto focusing by the phase-difference detection method using the phase difference of image signals obtained from the focus detection pixel group 106.

Figure 2A:
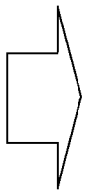
FIGS. 2A and 2B are schematic views showing the arrangement of focus detection pixels.
Figure 2B:
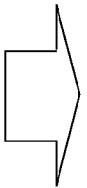

FIGS. 2A and 2B are schematic views showing the arrangement of the focus detection pixels. When thinning-out is not performed, focus detection is done using pairs of focus detection pixels at the positions of R and B pixels, as shown in FIG. 2A. In this case, the focus detection pixels arranged at the positions of R pixels correspond to S1, and the focus detection pixels arranged at the positions of B pixels correspond to S2. The arrangement position of focus detection pixels is not limited to the example of this embodiment. In this embodiment, however, pixels corresponding to the focus detection pixels S1 and S2 are assumed to be arranged at the positions of R and B pixels, respectively. When thinning-out is performed, focus detection is done using pairs of closest focus detection pixels at the positions of R and B pixels remaining after thinning-out, as shown in FIG. 2B. In this embodiment, thinning-out is executed every three lines. This thinning-out is done such that the image data includes focus detection pixels.

Figure 3:
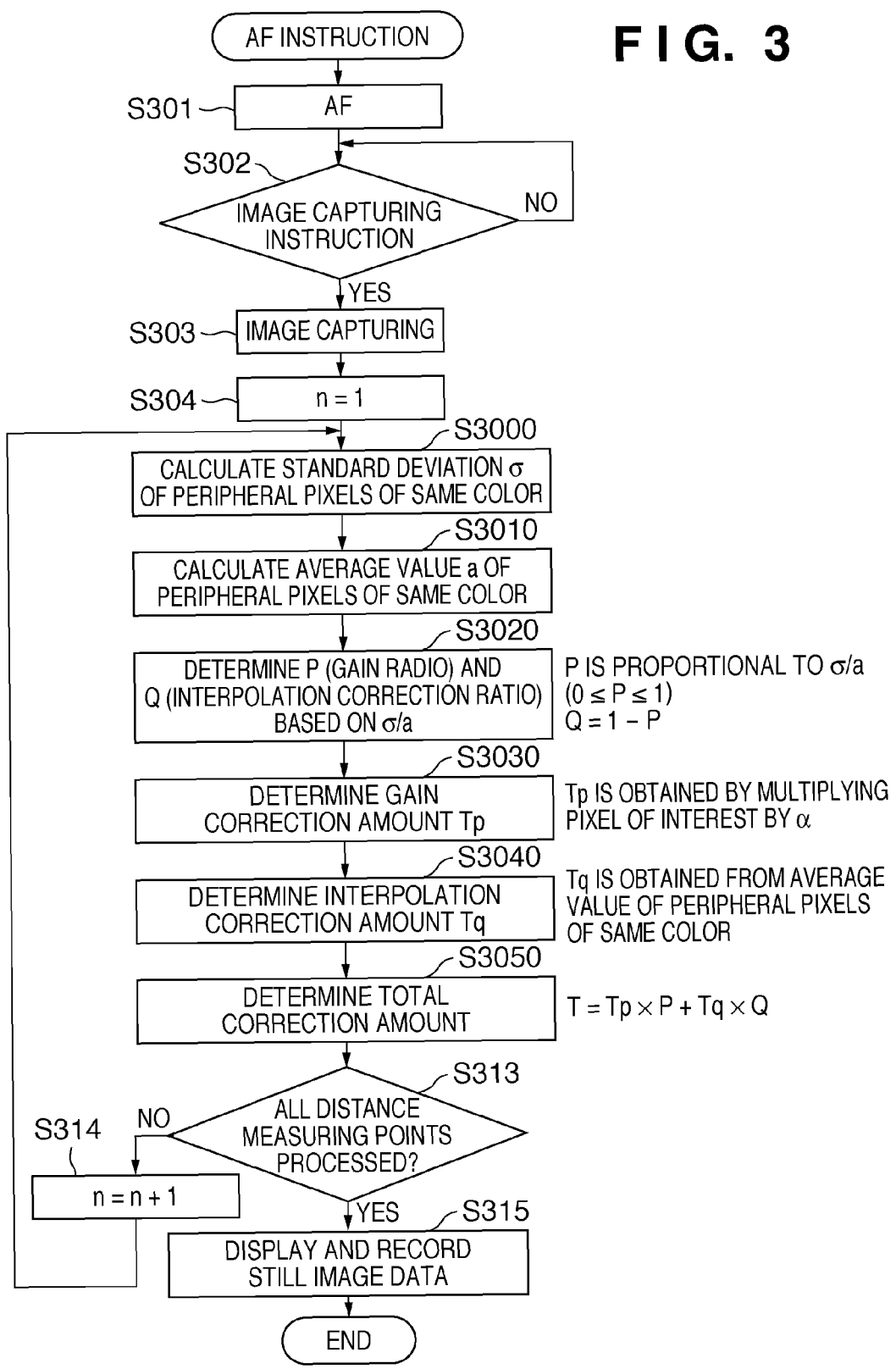
FIG. 3 is a flowchart illustrating the operation of the image capturing apparatus according to the embodiment of the present invention.
Figure 4:
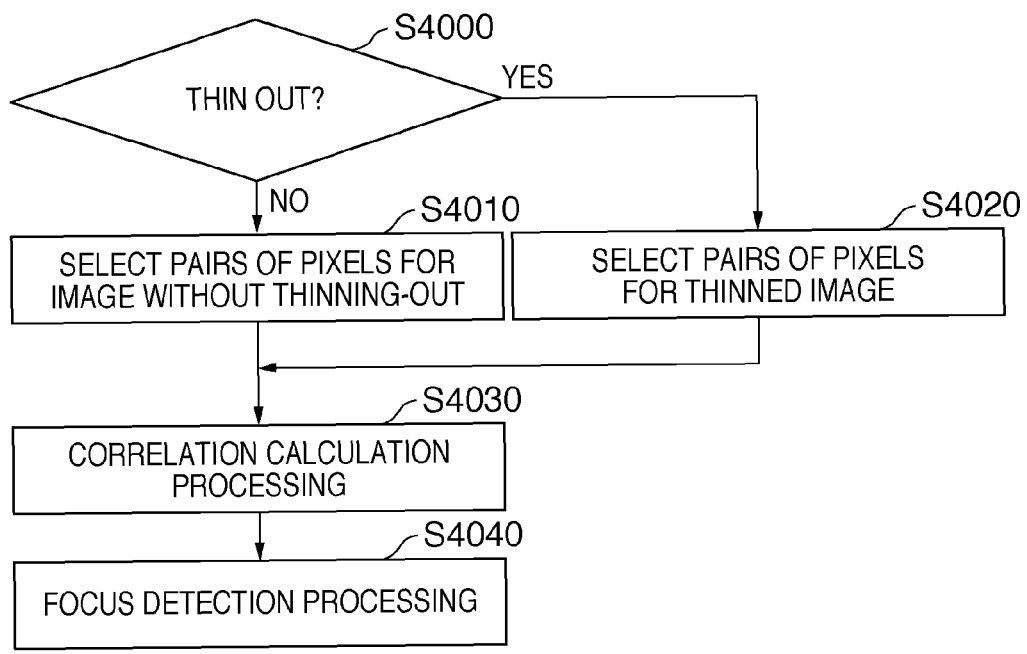
FIG. 4 is a flowchart illustrating a focus detection pixel selection operation when performing thinning-out readout and that without performing thinning-out readout.
Figure 5:
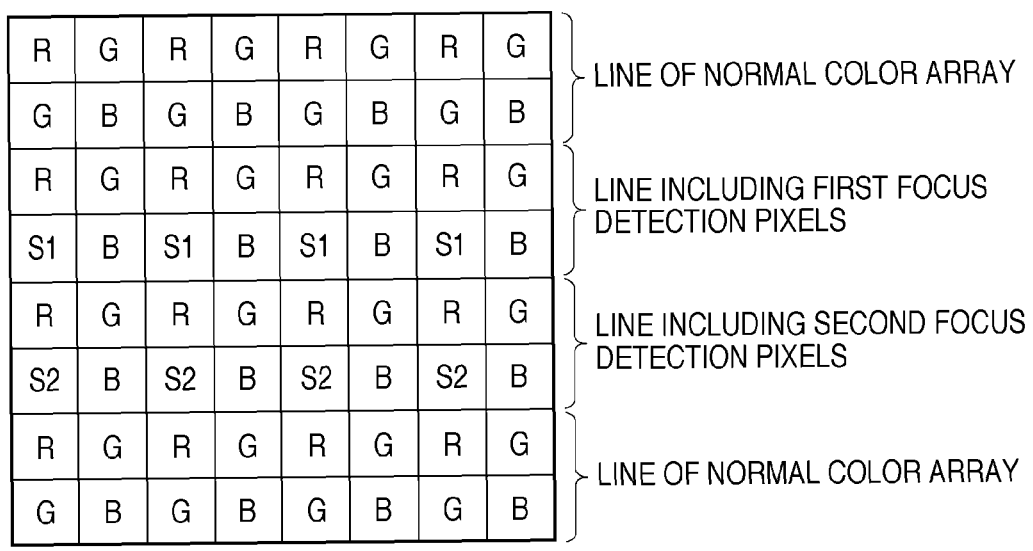
FIG. 5 is a view showing the pixel array of a conventional image sensor including focus detection pixels.

FIG. 3 is a flowchart illustrating the operation of the image capturing apparatus according to this embodiment. The image capturing apparatus of this embodiment starts step S301 when an AF instruction is generated from the operation input of the operation unit 116. Note that the description will be made assuming that exposure control has been done in advance before the AF instruction. When an AF instruction is generated in step S301, the image sensor 104 accumulates charges in the focus detection pixel group 106. When the accumulation has ended, the image sensor 104 outputs the image signal of the focus detection pixel group 106 to the focus detection unit 108. After the output, the focus detection unit 108 calculates the defocus amount based on the image shift amount between the arrays of pixels S1 and S2 in the focus detection pixel group 106, and instructs the lens control unit 102 to move the focal position of the lens 101 in accordance with the defocus amount. Upon receiving the instruction, the lens control unit 102 moves the focal position of the lens 101. FIG. 4 illustrates selection of the pairs of pixels S1 and S2. After the movement, the exposure condition is supposed to have changed due to the change of the defocus state of the object image. Hence, exposure control is performed again at the new focal position, and the process advances to step S302.

The method of selecting the focus detection pixels S1 and S2 when thinning out pixel signals and reading out them from the image sensor 104 and that when reading out pixel signals without thinning-out will be described here with reference to FIG. 4. In this embodiment, the AF operation is performed in a live view mode in which images sequentially obtained by the image sensor 104 are sequentially displayed on the display unit 114. In the live view mode, generally, image data of a smaller number of pixels is displayed on the display unit 114 by thinning out the pixels of the image sensor 104. In some cases, however, the pixel signals of the image sensor 104 are read out without thinning out the pixels. The image data is displayed on the display unit 114 after decreasing the data amount later by processing. For this reason, whether to thin out the pixels is selected at the stage of AF processing. Pairs of focus detection pixels are selected by the operation shown in FIG. 4.

In step S4000 of FIG. 4, it is determined whether to perform thinning-out. If thinning-out is not to be performed, pairs of focus detection pixels for an image without thinning-out are selected in step S4010 (see FIG. 2A). On the other hand, if thinning-out is to be performed, pairs of focus detection pixels for a thinned image are selected in step S4020 (see FIG. 2B). For the thinned image, thinning-out is done such that the image data includes focus detection pixels. In addition, closest pixels pair off. After that, in step S4030, correlation calculation is performed using the selected pixels. In step S4040, focus detection processing is executed.

Referring back to FIG. 3, in step S302, the camera control unit 117 determiners whether an image capturing instruction is generated from the operation input of the operation unit 116. If the operation input for the image capturing instruction has been done after the AF in step S301, the process advances to step S303. If the operation input for the image capturing instruction has not been done, the determination in step S302 is performed again. In step S303, charges are accumulated in the image forming pixel group 105 and the focus detection pixel group 106 of the image sensor 104. When the accumulation has ended, the image sensor 104 outputs the image signal of the image forming pixel group 105 to the spatial frequency detection unit 109 and the pixel interpolation unit 112, and outputs the image signal of the focus detection pixel group 106 to the focus detection unit 108 and the gain adjusting unit 111. After the output, the process advances to step S304.

In step S304, a counter to be used by the pixel interpolation unit 112 to perform interpolation processing for each distance measuring point on the imaging screen is initialized. A counter value n indicates a corresponding distance measuring point. In step S304, "1" is substituted as the initial value of n so as to perform the interpolation processing first for the first distance measuring point. After the setting, the process advances to step S3000.

In step S3000, a standard deviation σ of peripheral pixels of same color around the pixel of interest is calculated. In step S3010, an average value a of the peripheral pixels of same color is calculated. In step S3020, a gain radio P and an interpolation correction ratio Q (=1−P) are determined based on σ/a. P is proportional to σ/a (for 0≤P≤1). When σ is small (=when the spatial frequency is low), the gain correction ratio is low, and the interpolation correction ratio is high. Conversely, when σ is large (=when the spatial frequency is high), the gain correction ratio is high, and the interpolation correction ratio is low. Additionally, when the average value a is large (=when the spatial frequency is low), the gain correction ratio is low, and the interpolation correction ratio is high. Conversely, when the average value a is small (=when the spatial frequency is high), the gain correction ratio is high, and the interpolation correction ratio is low.

In step S3030, a gain correction amount Tp is determined. This is obtained by multiplying the pixel of interest by a predetermined gain amount α. In step S3040, an interpolation correction amount Tq is determined. This is obtained from the average value of the peripheral pixels of same color. In step S3050, Tp×P+Tq×Q is calculated as the total correction amount in accordance with the gain correction radio P and the interpolation correction ratio Q obtained in step S3020.

In step S313, the camera control unit 117 determines whether the pixel interpolation unit 112 has executed the interpolation processing for all distance measuring points. If the interpolation processing has not been performed for all distance measuring points yet, the counter value n is incremented by one in step S314, and the process returns to step S3000 to perform the above-described processing for the next distance measuring point. If all distance measuring points have been processed, the process advances to step S315.

In step S315, the image processing unit 113 performs gamma correction, white balance adjustment, resampling, and predetermined image compression coding for the interpolated image data. The image processing unit 113 outputs, to the display unit 114, the image data that has undergone the gamma correction, white balance adjustment, and resampling for display. After the output, the display unit 114 displays the output image data to allow the user to confirm the captured image. The image processing unit 113 also outputs, to the recording unit 115, the image data that has undergone the gamma correction, white balance adjustment, resampling for recording, and image compression coding. After the output, the recording unit 115 records the output image data. With the above-described operation, thinning-out is performed such that the image data includes focus detection pixels, and the pairs of pixels to be subjected to correlation calculation are changed. This makes it possible to perform correlation calculation and focus detection processing using appropriate pairs of pixels even when thinning out an image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-125849, filed May 25, 2009, which is hereby incorporated by reference herein in its entirety.

The invention claimed is:

1. An image capturing apparatus comprising:
an image sensor including image forming pixels each of which photoelectrically converts an object image formed via an imaging lens to generate a signal for image generation, and focus detection pixels which are discretely arranged among the plurality of image forming pixels, each focus detection pixel dividing a pupil region of the imaging lens and photoelectrically converting the object image from the divided pupil region to generate a signal for phase difference detection;
readout means for reading out the signal of each pixel of said image sensor;
focus detection means for detecting a focus by a phase-difference detection method using the signals for phase difference detection from the focus detection pixels; and
switching means for switching a combination of the focus detection pixels to be used for focus detection by said focus detection means between a case in which said readout means reads out the signals of the pixels of said image sensor while thinning-out and a case in which said readout means reads out the signals of the pixels of said image sensor without thinning-out,
wherein when reading out the signals of the pixels of said image sensor while thinning-out, said switching means switches the combination of the focus detection pixels so as to use, out of the pixels remaining that are not thinned-out, a combination of closest focus detection pixels for focus detection by said focus detection means.

2. The apparatus according to claim 1, wherein when reading out the signals of the pixels of said image sensor after thinning-out, said readout means thins out and reads out the signals of the pixels such that the signals include the focus detection pixels.

3. An image capturing apparatus comprising:
an image sensor including image forming pixels each of which photoelectrically converts an object image formed via an imaging lens to generate a signal for image generation, and focus detection pixels which are discretely arranged among the plurality of image forming pixels, each focus detection pixel dividing a pupil region of the imaging lens and photoelectrically converting the object image from the divided pupil region to generate a signal for phase difference detection;
a readout unit configured to read out the signal of each pixel of the image sensor;
a focus detection unit configured to detect a focus by a phase-difference detection method using the signals for phase difference detection from the focus detection pixels; and
a switching unit configured to switch a combination of the focus detection pixels to be used for focus detection by the focus detection unit between a case in which the readout unit reads out the signals of the pixels of the image sensor while thinning-out and a case in which the readout unit reads out the signals of the pixels of the image sensor without thinning-out,
wherein when reading out the signals of the pixels of the image sensor while thinning-out, the switching unit switches the combination of the focus detection pixels so as to use, out of the pixels remaining that are not thinned-out, a combination of closest focus detection pixels for focus detection by the focus detection unit.

4. A method for capturing an image comprising:
photoelectrically converting, by image forming pixels of an image sensor, an object image formed via an imaging lens to generate a signal for image generation;
photoelectrically converting, by focus detection pixels of the image sensor, which are discretely arranged among the plurality of image forming pixels and which divide a pupil region of the imaging lens, the object image from the divided pupil region to generate a signal for phase difference detection;
reading out the signal of each pixel of the image sensor;
detecting a focus by a phase-difference detection method using the signals for phase difference detection from the focus detection pixels; and
switching a combination of the focus detection pixels to be used for focus detection between a case in which the signals of the pixels of the image sensor are read out while thinning-out and a case in which the signals of the pixels of the image sensor are read out that are not thinned-out,
wherein, when reading out the signals of the pixels of the image sensor while thinning-out, the combination of the focus detection pixels are switched so as to use, out of the pixels remaining that are not thinned-out, a combination of closest focus detection pixels for focus detection.

5. The method according to claim 4, wherein, when reading out the signals of the pixels of the image sensor while thinning-out, the signals of the pixels are read out and thinned out such that the signals include the focus detection pixels.

* * * * *